(12) United States Patent
Lee (10) Patent No.: US 10,122,984 B2
(45) Date of Patent: Nov. 6, 2018

(54) PAN/TILT/ZOOM CAMERA BASED VIDEO PLAYING METHOD AND APPARATUS

(71) Applicant: SK TELECOM CO., LTD., Seoul (KR)

(72) Inventor: Gwang-gook Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/488,118

(22) Filed: Apr. 14, 2017

(65) Prior Publication Data
US 2017/0264877 A1 Sep. 14, 2017

Related U.S. Application Data

(63) Continuation of application No. PCT/KR2015/010478, filed on Oct. 5, 2015.

(30) Foreign Application Priority Data

Oct. 24, 2014 (KR) ........................ 10-2014-0145032

(51) Int. Cl.
| | |
|---|---|
| *H04N 9/80* | (2006.01) |
| *H04N 9/87* | (2006.01) |
| *H04N 5/232* | (2006.01) |
| *G06K 9/00* | (2006.01) |
| *G11B 27/10* | (2006.01) |
| *H04N 5/14* | (2006.01) |

(52) U.S. Cl.
CPC .......... *H04N 9/87* (2013.01); *G06K 9/00718* (2013.01); *G06K 9/00744* (2013.01); *G06K 9/00765* (2013.01); *G11B 27/10* (2013.01); *H04N 5/147* (2013.01); *H04N 5/232* (2013.01); *H04N 5/23238* (2013.01); *H04N 5/23296* (2013.01); *G06K 2009/00738* (2013.01)

(58) Field of Classification Search
USPC .................................................. 386/241, 248
See application file for complete search history.

(56) References Cited

U.S. PATENT DOCUMENTS

| | | | | |
|---|---|---|---|---|
| 2002/0003575 | A1* | 1/2002 | Marchese | ........... G06F 17/3025 348/231.99 |
| 2002/0041698 | A1* | 4/2002 | Ito | ........................ G06T 7/254 382/103 |

(Continued)

FOREIGN PATENT DOCUMENTS

| | | |
|---|---|---|
| JP | 2011-182253 A | 9/2011 |
| KR | 10-2003-0085810 A | 11/2003 |

(Continued)

OTHER PUBLICATIONS

International Search Report for PCT/KR2015/010478 dated Jan. 14, 2016.

*Primary Examiner* — Nigar Chowdhury
(74) *Attorney, Agent, or Firm* — Hauptman Ham, LLP (57) ABSTRACT

A pan/tilt/zoom (PTZ) camera based video reproducing method and a PTZ camera based video reproducing apparatus are disclosed. The present disclosure in some embodiments provides PTZ camera based video reproducing method and apparatus that recognize, from a plurality of preset videos captured by a PTZ camera, the preset videos from the same imaged location, select the recognized preset videos, and reproduce the video images of choice.

7 Claims, 5 Drawing Sheets

(56) References Cited

U.S. PATENT DOCUMENTS

| | | | | |
|---|---|---|---|---|
| 2010/0027961 A1* | 2/2010 | Gentile | ............... | G06T 5/50 |
| | | | | 386/278 |
| 2010/0104256 A1* | 4/2010 | Tsurumi | ............ | G06K 9/00335 |
| | | | | 386/241 |
| 2011/0135208 A1* | 6/2011 | Atanassov | ............ | G06T 5/50 |
| | | | | 382/218 |
| 2011/0150282 A1* | 6/2011 | Gupta | ............ | G06K 9/00771 |
| | | | | 382/103 |
| 2011/0310291 A1* | 12/2011 | Kato | ............ | H04N 5/23212 |
| | | | | 348/354 |
| 2012/0162416 A1* | 6/2012 | Su | ............ | H04N 7/185 |
| | | | | 348/143 |
| 2012/0188367 A1* | 7/2012 | Marcu | ............ | G01B 11/022 |
| | | | | 348/135 |
| 2013/0136429 A1* | 5/2013 | Bennett | ............ | H04N 21/2343 |
| | | | | 386/353 |

FOREIGN PATENT DOCUMENTS

| | | |
|---|---|---|
| KR | 10-2011-0032065 A | 3/2011 |
| KR | 10-2013-0046427 A | 5/2013 |
| KR | 10-2013-0104024 A | 9/2013 |

* cited by examiner

PAN/TILT/ZOOM CAMERA BASED VIDEO PLAYING METHOD AND APPARATUS

CROSS-REFERENCE TO RELATED APPLICATION

This application is a continuation of International Application No. PCT/KR2015/010478, filed Oct. 5, 2015, which claims priority to Korean Patent Application No. 10-2014-0145032, filed on Oct. 24, 2014, the entire content of which is incorporated herein by reference.

TECHNICAL FIELD

The present disclosure in some embodiments relates to a pan-tilt-zoom (PTZ) camera based video reproducing method and apparatus.

BACKGROUND

The statements in this section merely provide background information related to the present disclosure and do not necessarily constitute prior art.

A PTZ (Pan-Tilt-Zoom) camera has an omni-directionally rotatable pan/tilt gear combined with a full-automatic zoom lens. It is capable of controlling a rotation and zoom-in/out through external control. Compared to fixed cameras, yet expensive, it's advantages are capabilities for monitoring a wide area through camera rotation as well as monitoring long range/short range monitor and enlarging of objects of interest through zoom lens.

Conventional event monitoring apparatus using such PTZ cameras freshly generates background model for object monitoring every time they receive an image frame. Or, it performs monitoring by freshly generating background model for every preset video images by receiving control signals of the PTZ camera's displacement. However, the conventional event monitoring apparatuses show decline in ability of detecting moving objects because each and every PTZ camera movement generates a new background model. An increase in computation volume to generate a background model is another drawback.

In addition, when reproducing captured images taken by the PTZ camera, a manager has to continuously monitor the captured images to perceive and detect specific situations and consecutively monitor preset images of different views. Thus, a fast and easy way of searching and reproducing a large volume of preset images is needed.

DISCLOSURE

Technical Problem

The present disclosure in some embodiments provides a pan/tilt/zoom (PTZ) camera-based video reproducing method and a PTZ camera-based video reproducing apparatus that recognize, from a plurality of preset videos captured by a PTZ camera, the preset videos from the same imaged location, select the recognized preset videos, and reproduce the video images of choice.

SUMMARY

In accordance with some embodiments of the present disclosure, there is provided an apparatus including a video reproduction apparatus for performing a selective reproduction of captured video images having a plurality of imaged sections obtained by a pan/tilt/zoom (PTZ) camera capable of multidirectional imaging at one location, the video reproduction apparatus including a reference image generation unit configured to generate a reference image of video images in a selected section of the captured video images, an image detection unit configured to detect same video images that corresponds to the selected section, based on the reference image, and a video reproduction unit configured to reproduce the same video images consecutively.

In accordance with another embodiment of the present disclosure, there is provided a method including a video reproduction method of performing a selective reproduction of captured video images having a plurality of imaged sections obtained by a pan/tilt/zoom (PTZ) camera capable of multidirectional imaging at one location, the video reproduction method including generating a reference image of video images in a selected section of the captured video images, detecting same video images that corresponds to the selected section, based on the reference image, and reproducing the same video images consecutively.

Advantageous Effects

According to the present disclosure as described above, the present embodiments provide an effect that a manager can search or monitor only a preset video with respect to a specific view for a video imaging in which the view of the camera is repeatedly changed. The manager can search or monitor only the preset video with respect to a specific view, thereby improving the monitoring efficiency of searching.

| REFERENCE NUMERALS | |
|---|---|
| 110: PTZ camera | 120: event detection apparatus |
| 130: image acquisition unit | 140: scene change detection unit |
| 150: background model control unit | |
| 160: existing background model processing unit | |
| 170: new background model processing unit | |
| 180: event detection unit | 190: image reproduction apparatus |
| 192: shooting location setting unit | 194: reference image generation unit |
| 196: image detection unit | 198: image reproduction unit |

DETAILED DESCRIPTION

Hereinafter, at least one embodiment of the present disclosure will be described in detail with reference to the accompanying drawings.

Figure 1:
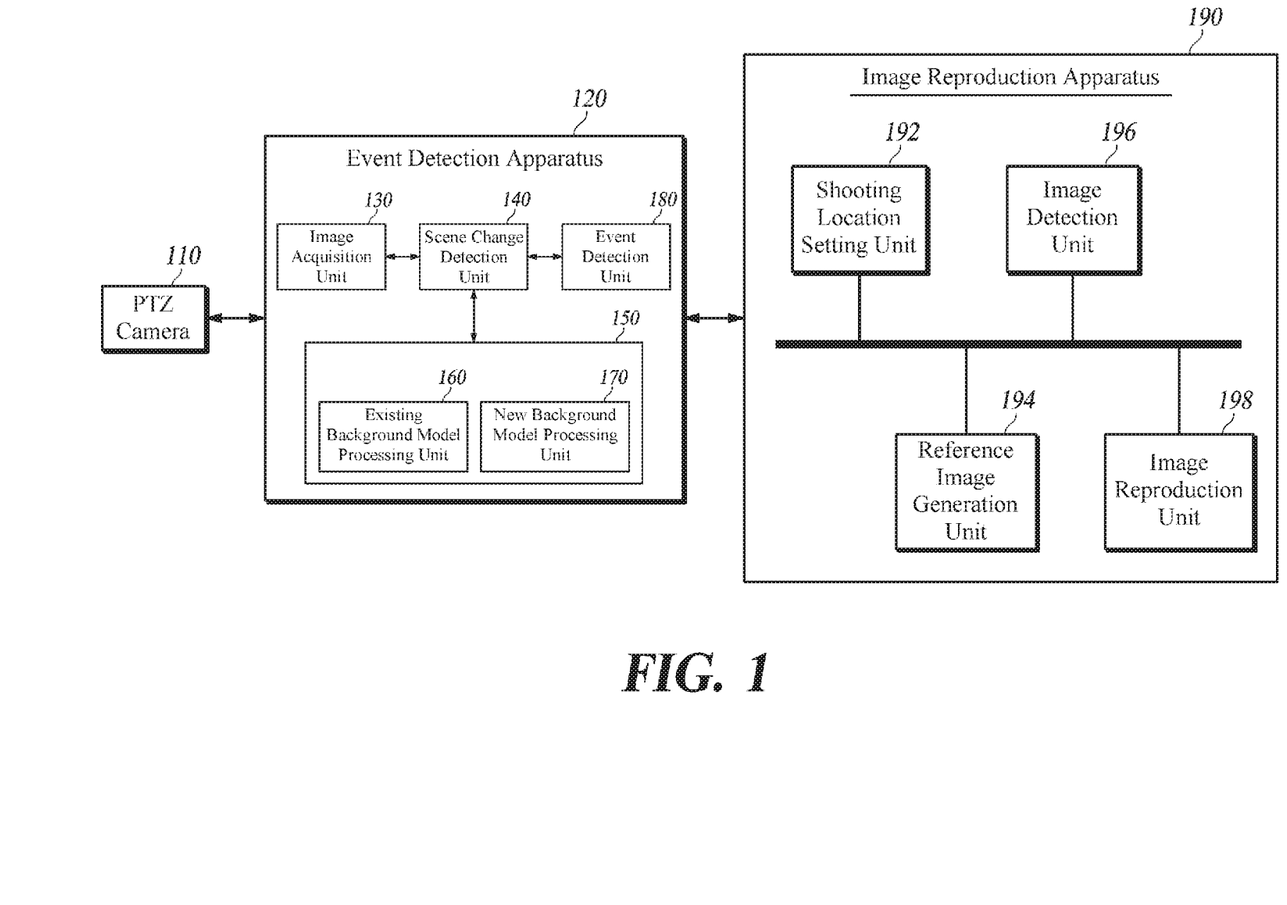
FIG. 1 is a block diagram of a pan-tilt-zoom (PTZ) camera based event monitoring system according to at least one embodiment of the present disclosure.

FIG. 1 is a block diagram of a pan-tilt-zoom (PTZ) camera based event monitoring system according to at least one embodiment of the present disclosure.

In accordance with an embodiment, an event monitoring system includes a PTZ camera 110, an event detection apparatus 120, and an image reproduction apparatus 190. Here, the event detection apparatus 120 includes an image acquisition unit 130, a scene change detection unit 140, and a background model control unit 150. The image reproduction apparatus 190 includes a shooting location setting unit 192, a reference image generation unit 194, an image detection unit 196, and an image reproduction unit 198.

The PTZ camera 110 is a camera having functions of pan, tilt, zoom, etc. It monitors a designated location or area by panning, tilting, and zooming the designated location or area in any direction. Since the PTZ camera 110 is capable of varying a shooting area to be monitored, it has a wider surveillance area compared to conventional fixed cameras.

The PTZ camera 110 is capable of connecting itself with managing devices (not shown) via wired or wireless communications. It may be operated in a surveillance mode by using control commands received from the managing devices (not shown). The surveillance mode includes, basically, two modes: a manual mode; and a preset mode. In the manual mode, a manager manually adjusts the PTZ camera 110 by using an input device, e.g., a joystick. In the preset mode, the PTZ camera 110 can automatically monitor a designated area for a preset time or period.

The PTZ camera 110 according to an embodiment may be a speed dome camera disposed at a fixed position of a specific place set by a manager. The PTZ camera 110 generates image frames for an area of interest in the preset mode and transmits them to the event detection apparatus 120 by using wired or wireless communications.

The PTZ camera 110 continuously or repeatedly captures preset video images for a designated location or area by using functions such as pan, tilt, zoom, etc. for a prescribed time or period. For example, the PTZ camera 110 can operate on a preset mode of a period of 20 or 30 seconds with an interval movement of 120 degrees according to a control signal acquired from a managing device (not shown). In this event, the PTZ camera 110 captures a first preset video (0 to 120 degrees) for the first 20 to 30 seconds, the second preset video (120 to 240 degrees) for the next 20 to 30 seconds, the third preset video (240 to 360 degrees) for the next 20 to 30 seconds. Upon acquiring the third preset video, the PTZ camera 110 again captures the first preset video (0 to 120 degrees) for the next 20 to 30 seconds. In the same manner, it repeatedly captures the first preset video, the second preset video, and the third preset video for a prescribed period of time.

The event detection apparatus 120 acquires image frames of the prescribed preset video from the PTZ camera 110. It then conducts an event monitoring operation based on a background model which is generated by means of detecting a scene change between the acquired video and the preset video.

The image acquisition unit 130 receives image frames of the preset video captured by the PTZ camera 110. The preset video may be a plurality of images of different views consecutively captured by PTZ camera 110.

The image acquisition unit 130 may receive the image frames of the captured preset videos in real time, or may receive the image frames of a plurality of preset videos that have been previously captured.

Specifically, the image acquisition unit 130 acquires image frames of preset videos which the PTZ camera 110 captured in at least one designated location or area and in a prescribed period of time. For example, the image acquisition unit 130 receives image frames of a first preset video which is captured images of a first area prescribed by the PTZ camera 110. After the image acquisition unit 130 receives every image frame of the first preset video for the prescribed period of time, it receives image frames of a second preset video which is captured by the PTZ camera 110 which has moved to a second area.

The image acquisition unit 130 repeatedly receives preset videos from the PTZ camera 110 according to a preset period. For example, the image acquisition unit 130 receives a first preset video (e.g., 0 or 120 degrees) of a first area, a second preset video (e.g., 120 or 240 degrees) of a second area, and a third preset video (e.g., 240 or 360 degrees) of a third area in order. Then it again receives the first preset video, the second preset video, and the third preset video in order.

As a unit for detecting whether or not the PTZ camera 110 has changed its shooting view, the scene change detection unit 140 detects whether or not the preset video received from the image acquisition unit 130 has changed from the previous one. In other words, the scene change detection unit 140 identifies whether the image frame of a prescribed preset video received from the image acquisition unit 130 is included in the same preset video of previous (neighboring) image frames. For example, the scene change detection unit 140 detects a difference between the image frame received from the image acquisition unit 130 and the previous (neighboring) image frames. If the difference is greater than or equal to a prescribed threshold value or rate, the scene change detection unit 140 determines the two preset videos as different preset videos.

If the difference between the image frame received from the image acquisition unit 130 and the previous image frames is less than a prescribed threshold value or rate, the preset video including the received image frame and the preset video including the previous image frames are determined as representing a same scene, i.e., an identical preset video without a scene change.

Hereinafter, an operation of the scene change detection unit 140 for identifying a scene change by comparing present image frame with previous (neighboring) image frame according to an embodiment of the invention will now be described.

The scene change detection unit 140 detects a scene change of the preset video based on a pixel difference value. Here, the pixel difference value is a data obtained by comparing the values representing brightness or colors of the whole or part of the pixels of a present image frame and those of a previous image frame.

For example, the scene change detection unit 140 performs sampling of brightness or colors of pixels of prescribed lines such as vertical, diagonal, and horizontal lines for each present and previous image frame that is comprised of w (row pixel counts)×h (column pixel counts) pixels.

The scene change detection unit 140 calculates sampled pixel values that correspond to a same line on the present image frame and on the previous image frame. If the difference between the calculated values is greater than or equal to a threshold value, the preset video that includes the present image frame is determined to have changed. Although it is described above that the scene change detection unit 140 uses pixels of a prescribed line to detect a change in preset videos, it may be for the sake of reduction in the computation volume. As an alternative embodiment, therefore, any prescribed set of pixels may be compared for the detection of the change of the scene.

The scene change detection unit 140 in FIG. 1 can utilize a Visual Rhythm method to detect change in scene but it is not limited thereto. Any method may be applied if a scene change of preset videos can be detected by using a specific image frame and its neighboring image frame.

When the scene change detection unit 140 identifies a present image frame as being different from a preset image frame, the background model control unit 150 generates or extracts another background model corresponding to the present image frame and sends the fresh background model to an event detection unit 180. Specifically, when a background model corresponding to the preset video that includes the present image frame exists, the background model control unit 150 replaces the existing background model with the latest one. On the contrary, when there is no existing background model, the background model control unit 150 generates a fresh background model that corresponds to the image frame.

The background model control unit 150 according to a preferred embodiment includes an existing background model processing unit 160 and a new background model processing unit 170.

The existing background model processing unit 160 extracts an existing background model corresponding to a preset video which includes a present image frame. In other words, upon comparing the present image frame with existing background models, the existing background model processing unit 160 extracts an existing background model determined to be similar with the present image frame. Here, the existing background model refers to a background model for which a plurality of image frames for a specific preset video are continuously updated upon a new background model of a specific preset video including a present image frame.

For example, when a present image frame is included in a first preset video, the existing background model processing unit 160 detects the existence of a background model corresponding to the first preset video to extract the existing background model. Herein, the existing background model corresponding to the first preset video refers to a background model upon which image frames of the first preset video are continuously updated after a background model with respect to a first image frame corresponding to a first preset video is generated and before an image frame corresponding to a second preset video is received.

The existing background model processing unit 160 may extract existing background models from both the database (not shown) outside of the event detection apparatus 120 and the storage inside of the event detection apparatus 120.

Operations for extracting an existing background model of a preset video including a present image frame based on a comparison between a present image frame and plural previous background models will be described below.

The existing background model processing unit 160 calculates a difference value by comparing the present image frame with the plural previous background models. The existing background model processing unit 160 calculates the difference value by using Equation 1.

$$e(m_i) = \sum_{x=0}^{W} \sum_{y=0}^{H} (I(x, y) - m_i(x, y))^2 \quad \text{Equation 1}$$

Herein e denotes a difference value, m denotes a background model, W denotes a width of a present image frame, H denotes a height of the present image frame, x, y denotes a prescribed pixel (coordinate value), I denotes an inputted present image frame.

The existing background model processing unit 160 calculates the difference value e(mi) by summing the sequence of difference with the width and height of the image frame, respectively, wherein the difference is obtained by extracting mi(x, y) which is a color value of background model mi at the position of pixel (x, y) from I(x, y) which is a present image frame at the position of pixel (x, y).

The existing background model processing unit 160 selects a background model that has a minimum value among a plurality of difference values e(mi). If the difference value e(mi) is smaller than a preset threshold value T, the selected background model is extracted as an existing background model similar to the present image frame.

In order to reduce an error due to the objects included in the present image frame in calculating the difference value, the existing background model processing unit 160 may perform comparison operation by using only the background area other than the area in which a plurality of objects are expected to exist in the frame.

The existing background model processing unit 160 generates an updated background model by updating (learning) the extracted existing background model by using the present image frame. Hereinafter, the operation of updating the existing background model by the existing background model processing unit 160 will now be described.

The existing background model processing unit 160 updates background models by calculating an accumulated sum of the existing background model and the newly received image frame. More specifically, the existing background model processing unit 160 generates an updated background model $m_{t+1}(x, y)$ at time (t+1) by using the accumulated sum of the existing background model $m_t(x, y)$ of the pixel (x, y) at time t and the image frame $I_t(x, y)$ inputted at time t. Updating operation of the existing background model can be given as Equation 2.

$$m_{t+1}(x,y) = (1-\alpha) \times m_t(x,y) + \alpha \times I_t(x,y) \quad \text{(Equation 2)}$$

Herein m denotes a background model, x, y denote a prescribed pixel (coordinate value), α denotes a background model learning rate, t denotes a present time, I denotes an inputted image frame.

According to Equation 2, an existing background model is updated in a learning rate α, and the learning rate α has a value between 0 and 1.

Meanwhile, the existing background model processing unit 160 can update the present image frame having no change from the preset video. In other words, when the present image frame having no change from the preset video is received, the existing background model processing unit 160 can generate the updated background model by updating the previous background model with the present image frame.

The new background model processing unit 170 generates a new background model for the present image frame. More specifically, when the existing background model corresponding to the preset video including the present image frame does not exist, the new background model processing unit 170 generates a new background model for the present image frame. For example, if the present image frame is included in a first preset video and an existing background model exists only for a second preset video and a third preset video, a new background model is generated based on the present image frame.

The event detection unit 180 receives background model from the background model control unit 150 and detects an event for an object moving in the area of interest excluding the background model in the present image frame. In other words, the event detection unit 180 detects an event in the area of interest other than the generated new background model or the updated background model received from the background model control unit 150. The event detection unit 180 transmits the event detection result information in the area of interest to the user or the manager and outputs the information.

The event detection unit 180 sets a pixel block within an area of interest and performs an image segmentation by using edge detection and pre-stored reference image comparison based on the pixel block to classify the object. However, the present invention is not limited thereto, and object recognition may be performed by sliding a window having a predetermined size in an area of interest.

The image reproduction apparatus 190 recognizes a preset video of the same position among a plurality of preset videos captured from the PTZ camera 110, and selects and reproduces only the recognized preset video. Here, the image reproduction apparatus 190 may directly acquire a plurality of captured preset videos from the PTZ camera 110, but the present invention is not limited thereto. The image reproduction apparatus 190 may acquire a plurality of preset videos from a database (not shown) or a plurality of previously stored preset videos after the event detection apparatus 120 performs the event detection. Hereinafter, an operation of selectively playing a plurality of preset videos previously stored in the image reproduction apparatus 190 will now be described.

The shooting location setting unit 192 sets a position where the image of the plurality of preset videos is captured in order to select a specific preset video. The shooting location setting unit 192 determines a preset video selected based on the selection signal corresponding to a manager's operation or command among a plurality of preset videos as a specific preset video. For example, when the selection signal for a first preset video among the plurality of preset videos including the first preset video, a second preset video, a third preset video is received, the shooting location setting unit 192 sets the first preset video as the specific preset video.

On the other hand, the shooting location setting unit 192 may select each preset video of a plurality of preset videos taken at different positions as the specific preset video.

The reference image generation unit 194 generates a reference image for a specific preset video. Here, the reference image refers to an image for detecting a preset video captured at the same position as a specific preset video.

The reference image generation unit 194 sets a first image frame of a specific preset video as a reference image or an image frame having average pixels of a plurality of image frames included in a specific preset video as a reference image. More specifically, the reference image generation unit 194 may set a first frame among a plurality of image frames included in a specific preset video as a reference image. The reference image generation unit 194 calculates an average pixel value using pixels at the same area in each of a plurality of image frames included in the specific preset video, and generates a reference image by using the average pixels having the calculated average pixel value as a reference image.

The reference image generation unit 194 generates a plurality of reference images that correspond to each specific preset video when a plurality of specific preset videos captured for different views are selected by the shooting location setting unit 192.

The image detection unit 196 recognizes and detects the same preset video captured for the same view and the specific preset video based on the reference image.

The image detection unit 196 compares a reference image with one or more preset videos following a specific preset video. When the pixel difference value obtained upon the comparison is less than a predetermined threshold value, the image detection unit 196 recognizes and sets the preset video as a same preset video as the specific preset video.

The image detection unit 196 compares the reference image with one or more preset videos following a specific preset video. When the pixel difference value obtained upon the comparison is greater than or equal to a predetermined threshold value, the image detection unit 196 recognizes the preset video as a preset video that presents a view different from that of the specific preset video. Here, if there exist one or more preset videos following the preset video that presents a different view, the image detection unit 196 compares the following preset videos with the reference image to determine whether the same preset video is captured at the same position as the specific preset video. The image detection unit 196 repeats the operation of confirming whether the preset video is the same or not when there are one or more following preset videos.

On the other hand, if there is no following preset video after the preset video taken with respect to a different view, the image detection unit 196 stops checking whether the same preset video is present or not.

When a plurality of reference images are generated by the reference image generation unit 194, the image detection unit 196 detects each of the same preset videos corresponding to the respective reference images, so that they are stored consecutively based on their shooting locations or views. Here, it is preferable that each of the detected preset videos is transmitted to and stored in a database (not shown), but the present invention is not limited thereto. The preset videos may be stored in a storage unit (not shown) inside the image reproduction apparatus 190.

The image reproduction unit 198 continuously reproduces the same preset video of the same view as the specific preset video in the order of time.

Figure 2:
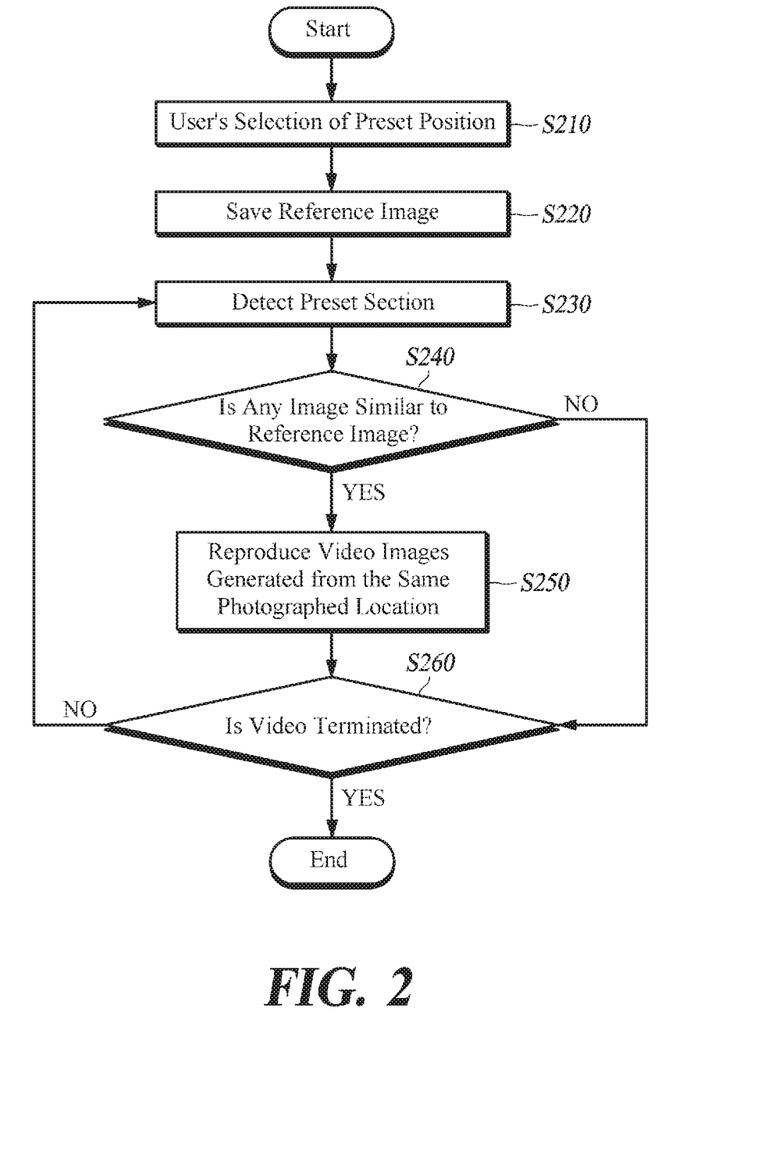
FIG. 2 is a flowchart illustrating a method of reproducing an image of a PTZ camera, according to an embodiment of the present invention.

FIG. 2 is a flowchart illustrating a method for reproducing an image of a PTZ camera according to an embodiment of the present invention.

The image reproduction apparatus 190 selects a specific preset video among a plurality of preset videos at step S210. The image reproduction apparatus 190 determines a preset video that is selected based on a selection signal corresponding to an operation or command of the manager among a plurality of preset videos as a specific preset video.

The image reproduction apparatus 190 generates and stores a reference image for a specific preset video at step S220. Here, the reference image refers to an image for detecting a preset video captured for the same shooting location or view as a specific preset video.

The image reproduction apparatus 190 detects the same preset video of the same position as the specific preset video at step S230. If it is determined at step S240 that there is an image frame similar to the reference image, the image reproduction apparatus 190 sets the preset video as the same preset video that presents the same view as the specific preset video and reproduces it at step S250.

If the image has not been terminated after detecting the same preset video at step S260, the procedure moves to step S230 where the image reproduction apparatus 190 detects the same preset video captured at the same position as the specific preset video.

Meanwhile, when the image is terminated after detecting the same preset video at step S260, the image reproduction apparatus 190 stops the operation of selectively reproducing the image.

Figure 3:
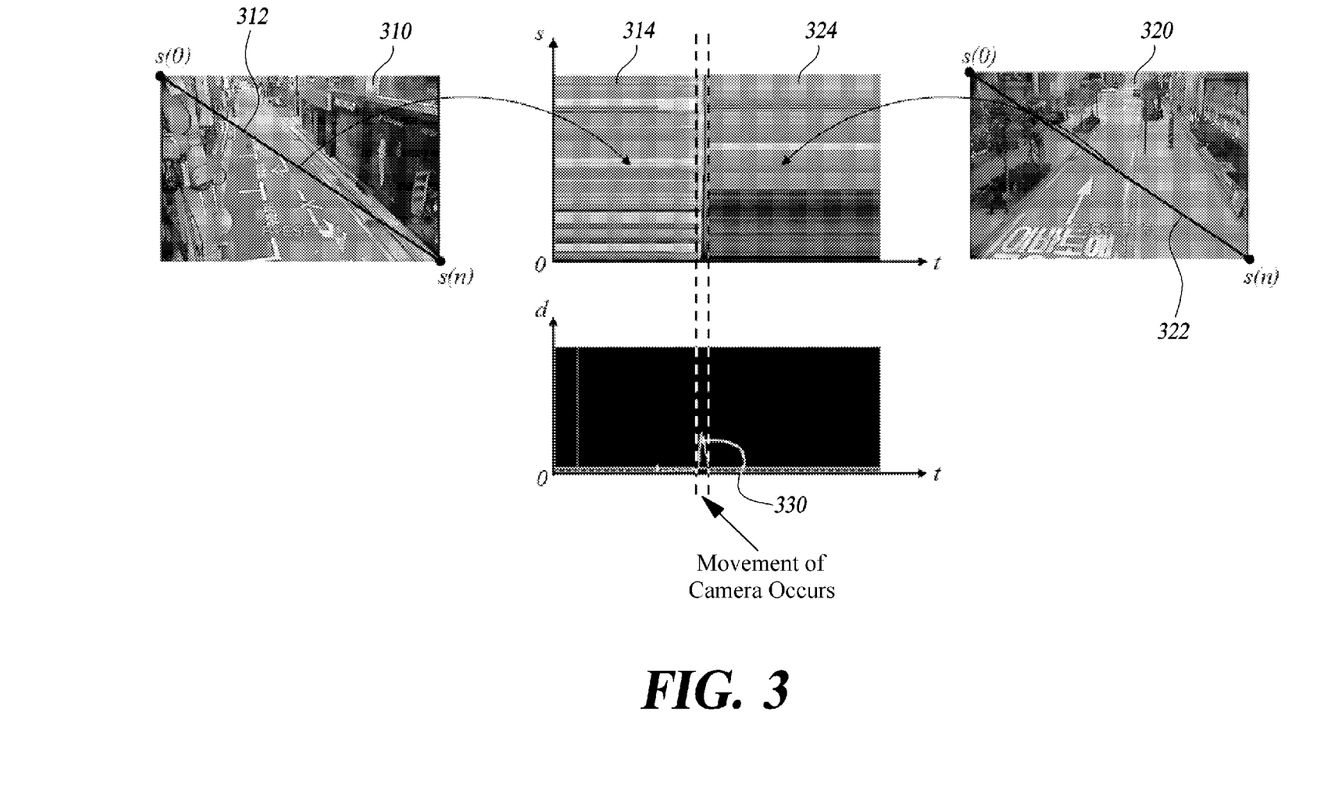
FIG. 3 is an exemplary diagram for illustrating an operation of checking a change of scene in a video reproducing apparatus, according to at least one embodiment of the present disclosure.

FIG. 3 is an exemplary diagram for illustrating an operation of checking a change of scene in a video reproducing apparatus according to at least one embodiment of the present disclosure.

As shown in FIG. 3, the image reproduction apparatus 190 recognizes the same preset video captured at the same position as the specific preset video by using the reference image and the prescribed preset video. In FIG. 3, the image reproduction apparatus 190 compares the reference image frame 310 with a prescribed preset image frame 320 to determine whether the reference image is the same preset video.

The image reproduction apparatus 190 generates a first sampling information 314 by sampling colors of n number of pixels located on a first diagonal line 312, S(0) through S(n), of the reference image frame. Similarly, the image reproduction apparatus 190 generates a second sampling information 324 by sampling colors of n number of pixels located on a second diagonal line 322, S(0) through S(n), of a preset image frame 320.

The image reproduction apparatus 190 calculates a color difference value d between two adjacent columns by using the first sampling information 314 and the second sampling information 324. Herein, the two adjacent columns correspond to two adjacent times.

The image reproduction apparatus 190 may be configured such that if the color difference value d calculated between the first sampling information 314 and the second sampling information 324 is greater than or equal to a prescribed threshold value, the preset image frame 320 is recognized as a preset video that presents a view different from the specific preset video.

Meanwhile, if the color difference value d calculated between the first sampling information 314 and the second sampling information 324 is less than a prescribed threshold value, that is, a peak value 330 does not exist, the image reproduction apparatus 190 recognizes the preset image frame 320 as the same preset video that presents the same view as the specific preset video.

Figure 4:
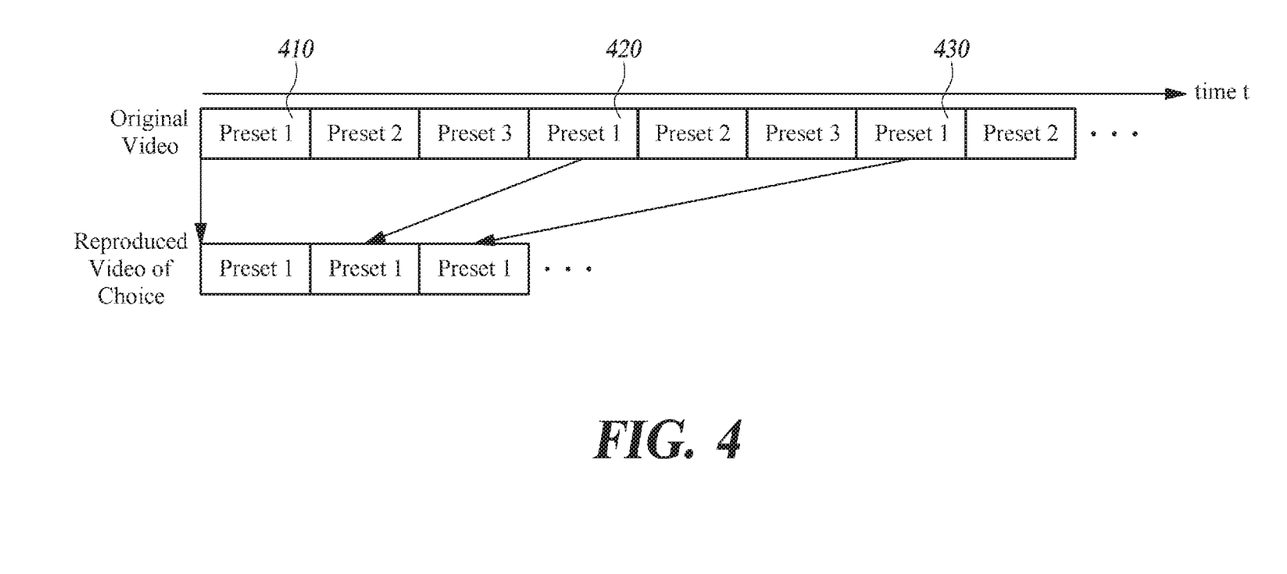
FIG. 4 is an exemplary diagram for illustrating an operation of detecting a preset video corresponding to a reference image in a video reproducing apparatus, according to at least one embodiment of the present disclosure.

FIG. 4 is an exemplary diagram for illustrating an operation of detecting a preset video corresponding to a reference image in a video reproducing apparatus according to at least one embodiment of the present disclosure.

As shown in FIG. 4, the image reproduction apparatus 190 selects a first preset video 410 to be reproduced first as a specific preset video, and generates a reference image for the first preset video 410 to be reproduced first.

The image reproduction apparatus 190 compares a second and a third preset videos, which are successively reproduced after the first preset video 410, with the reference image to recognize that they are not the same preset video.

The image reproduction apparatus 190 recognizes and detects the same preset video by comparing the reference image with a first preset video 420 that is reproduced next to the firstly reproduced third preset video. Thereafter, the image reproduction apparatus 190 compares the second and the third preset videos, which are successively reproduced, with the reference image to recognize that it is not the same preset video.

The image reproduction apparatus 190 recognizes and detects the same preset video by comparing the reference image with a first preset video 430 that is reproduced next to the secondly reproduced third preset video. Thereafter, the image reproduction apparatus 190 repeats the operation of confirming whether a preset video is the same or not until there is no preset video to be successively reproduced.

Figure 5:
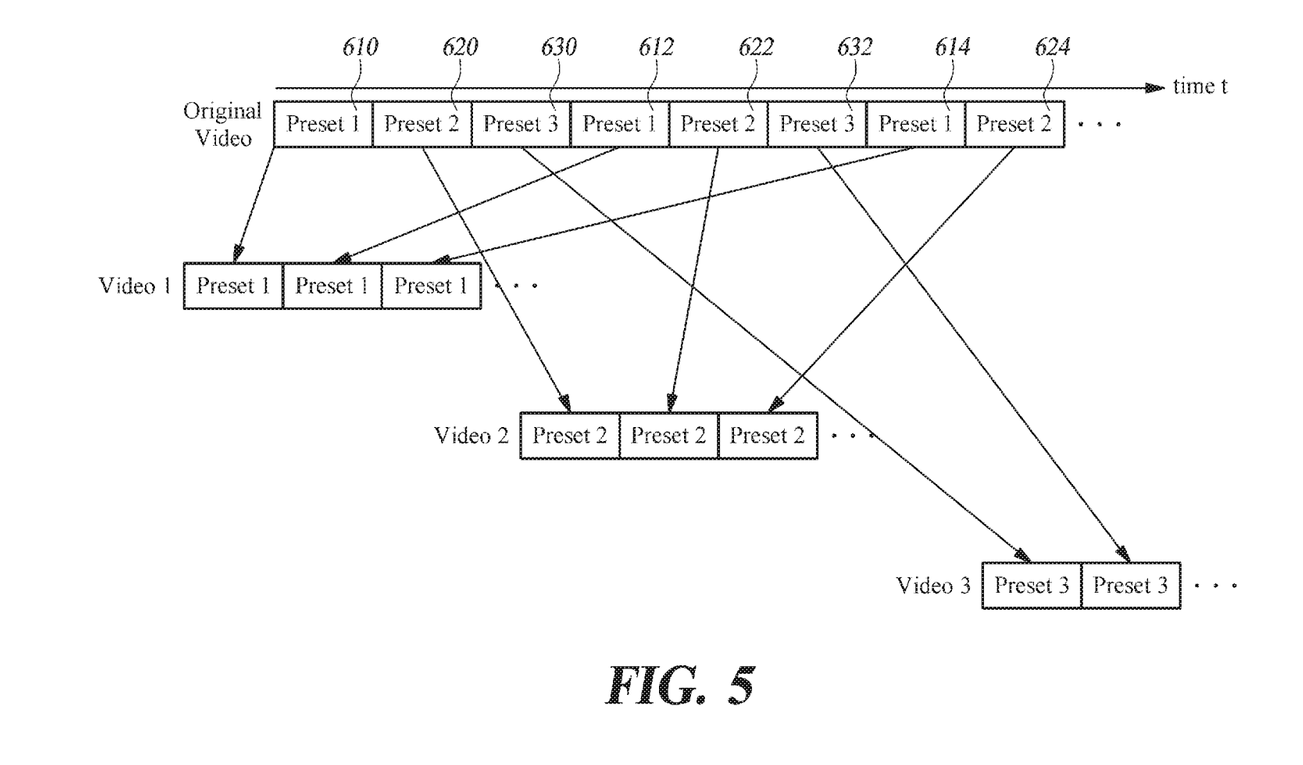
FIG. 5 is an exemplary diagram for illustrating an operation of detecting a preset video for each preset position, according to at least one embodiment of the present disclosure.

FIG. 5 is an exemplary diagram for illustrating an operation of detecting a preset video for each preset position, according to at least one embodiment of the present disclosure.

As shown in FIG. 5, the image reproduction apparatus 190 selects each of a 'first preset 1' 610, a 'first preset 2' 620, a 'first preset 3' 630, in which these three presets present different views respectively, among a plurality of preset videos as a specific preset video. Then the image reproduction apparatus 190 generates reference images for each of the specific preset videos.

The image reproduction apparatus 190 extracts a 'second preset 1' 612, a 'third preset 1' 614, and the like as the same preset video by using the reference image for the 'first preset 1' 610. The image reproduction apparatus 190 extracts a 'second preset 2' 622, a 'third preset 2' 624, and the like as the same preset video by using the reference image for the 'first preset 2' 620. The image reproduction apparatus 190 extracts a 'second preset 3' 632 as the same preset video by using the reference image for the 'first preset 3' 630.

The image reproduction apparatus 190 sequentially stores the extracted same preset videos of the same views to generate separate files for each of them. The image reproduction apparatus 190 also outputs and generates a separate file for the image of the selected view.

Although exemplary embodiments of the present disclosure have been described for illustrative purposes, those skilled in the art will appreciate that various modifications, additions and substitutions are possible, without departing from the idea and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the explicitly described above embodiments but by the claims and equivalents thereof.

ACKNOWLEDGEMENTS

At least some research related to this application was supported in part by the Information & Communication and Broadcast R & D Project through the Institute for Information & Communications Technology Promotion (IITP) and the Ministry of Science, ICT & Future Planning, Korea [B0101-15-0525, (Subsection 2) Development of Global Multi-target Tracking and Event Prediction Techniques Based on Real-time Large-scale Video Analysis].

The invention claimed is:

1. A video reproduction apparatus comprising:
   an image position setting unit configured to
     set a position at which (i) video images corresponding to a first section are taken, wherein the video images corresponding to the first section, which are captured at the set position, are selected from among a plurality of video images captured at various view positions by a single camera;

a reference image generation unit configured to generate a reference image for the first section of video images;

an image detection unit configured to detect (ii) video images corresponding to a second section from among the plurality of video images captured at the various view positions, based on the reference image, wherein the video images corresponding to the second section are detected by determining whether the video images corresponding to the second section are captured at the set position which is same to the first section; and a video reproduction unit configured to consecutively reproduce (i) the video images corresponding to the first section and (ii) the video images corresponding to the second section, which are captured at the same set position, among the plurality of video images captured at the various view positions.

2. The video reproduction apparatus of claim 1, wherein the image detection unit detects the second section of the video images when a pixel difference value between a frame of the second section of the video images and the reference image is less than a predetermined threshold value.

3. The video reproduction apparatus of claim 1, wherein the reference image generation unit is configured to generate the reference image using a first frame of the first section of the video image.

4. The video reproduction apparatus of claim 1, wherein the reference image generation unit is configured to calculate an average pixel value by using pixels at the same position in each of a plurality of image frames included in the first section of the video images, and generate the reference image by using the average pixel value.

5. The video reproduction apparatus of claim 1, further comprising an image position setting unit configured to select the first section of the video images based on an inputted selection signal.

6. The video reproduction apparatus of claim 1, wherein the image detection unit is configured to store the first section of the video images and the detected second section of the video images consecutively and separately form the video images.

7. A video reproduction method comprising:

setting a position at which (i) video images corresponding to a first section are taken, wherein the video images corresponding to the first section, which are captured at the set position, are selected from among a plurality of video images captured at various view positions by a single camera;

generating a reference image for the first section of video images;

detecting (ii) video images corresponding to a second section from among the plurality of video images captured at the various view positions, based on the reference image, wherein the video images corresponding to the second section are detected by determining whether the video images corresponding to the second section are captured at the set position which is same to the first section; and consecutively reproducing (i) the video images corresponding to the first section and (ii) the video images corresponding to the second section, which are captured at the same set position, among the plurality of video images captured at the various view positions.

* * * * *